United States Patent [19]

Kruse et al.

[11] Patent Number: 4,536,648
[45] Date of Patent: Aug. 20, 1985

[54] OPTICAL CARD READ/WRITE SCANNING SYSTEM

[75] Inventors: Richard M. Kruse; David J. Moffett; Madhu C. Patel; Ronald L. Barnes, all of Wichita, Kans.

[73] Assignee: NCR Corporation, Dayton, Ohio

[21] Appl. No.: 635,690

[22] Filed: Jul. 30, 1984

[51] Int. Cl.³ .............................................. G06K 7/10
[52] U.S. Cl. .................................. 235/454; 235/449; 235/470
[58] Field of Search ................ 235/454, 449, 461, 470

[56] References Cited

U.S. PATENT DOCUMENTS 4,250,488 2/1981 Haupt .................................. 235/455

Primary Examiner—Harold I. Pitts
Attorney, Agent, or Firm—Wilbert Hawk, Jr.; Albert L. Sessler, Jr.; George J. Muckenthaler

[57] ABSTRACT

An optical card is oscillated in an X direction along a curved path by a voice coil driver, and an optical read/write module is translated in the Y direction to read recorded information on the card.

10 Claims, 4 Drawing Figures

OPTICAL CARD READ/WRITE SCANNING SYSTEM

BACKGROUND OF THE INVENTION

In the field of document reading apparatus or systems, it has been common practice to utilize light or optic-related means for reading or scanning data or machine readable information. A document such as a card or sheet of paper is driven or caused to be moved in a path past a reading station and the reading device is moved across the card or paper for identifying the data or information. In the case of a credit card which includes a stripe of information thereon, the reader is moved along the stripe and the essential data is transferred to initiate operation of an apparatus or system.

Representative documentation in the field of reading information from cards or other record media includes U.S. Pat. No. 2,039,406, issued to E. L. Greensfelder on May 5, 1936, which discloses a scanning unit having an exciting lamp and a light sensitive cell in fixed angular relation to each other.

U.S. Pat. No. 3,549,826, issued to I. Browning on Dec. 22, 1970, discloses apparatus for reading rows of information having different light reflectivities by directing light continuously in scanning manner and receiving reflected light in a photosensitive signal converting device.

U.S. Pat. No. 3,555,246, issued to J. H. Lemelson on Jan. 12, 1971, discloses a document line reading device wherein light is directed onto the document and reflected back to a rotating apertured disk and also to light sensing means. The document is driven and controlled by detection means to properly position a selected line of characters in relation to the reading device.

U.S. Pat. No. 3,600,557, issued to J. M. Zappia on Aug. 17, 1971, discloses a system for scanning transversely extending lines of data on a document which includes a movable scanning head, means for moving the document relative to the head, and optical control means for finding a line of data to be scanned and stopping the movement. The system also includes a light source, a light responsive device, optical projecting means, an output device and circuit means for connecting the devices.

.U.S. Pat. No. 3,639,730, issued to R. F. Higginbotham et al. on Feb. 1, 1972, discloses an optical reader system having a scanning head, means for transversely moving the head relative to a document, drive means for moving the document longitudinally relative to the scanning head and optical control means for detecting a line of data and for stopping document movement.

U.S. Pat. No. 3,710,078, issued to J. H. Lemelson on Jan. 9, 1973, discloses document scanning apparatus having a scanning transducer operable to be moved in a plurality of directions with respect to the document and transducer control means which is responsive to marks or signals recorded on the document.

And, U.S. Pat. No. 3,731,062, issued to J. J. Reilly on May 1, 1973, discloses an optical card reader drive wherein means are provided to move an aligned light source and photodetector unit along the card to scan across the machine readable data field thereon.

SUMMARY OF THE INVENTION

The present invention relates to means for reading data or information from a card or other record media. More particularly, the present invention relates to means for reading an optical card supported at one end of an arm and wherein the card is moved in an oscillating manner in the X direction relative to a card reader station. The reader is moved in the Y direction to cover the reading area of the card, which area typically consists of or is defined by a stripe or like field of data along the length of the card. A voice-coil driver moves the card in the oscillating manner in the X direction by causing the card holder to pivot about an axis at the end of the arm distal from the card.

In view of the above discussion, the principal object of the present invention is to provide means for moving a machine-readable card past a reading station.

Another object of the present invention is to provide a card holder which is moved in an oscillating manner past a reading station.

An additional object of the present invention is to provide means for moving the reading station relative to the reading area on the card.

A further object of the present invention is to provide voice coil drive means for moving the card holder in oscillating motion.

Additional advantages and features of the present invention will become apparent and fully understood from a reading of the following description taken together with the annexed drawing.

DESCRIPTION OF THE PREFERRED EMBODIMENT

Figure 1:
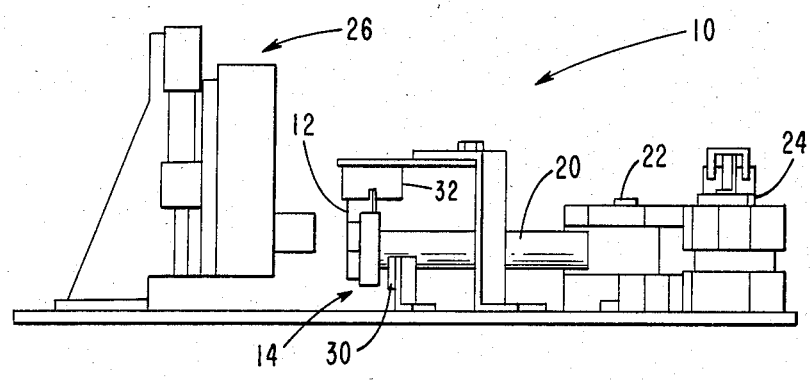
FIG. 1 is a side elevational view of an optical card reading apparatus incorporating the subject matter of the present invention.

FIG. 1 is a side elevational view of a prototype apparatus, generally designated as 10, for reading an optical card 12 which is positioned in, and supported from, a card holder 14. The card holder 14 is formed in an arcuate arrangement, as better illustrated in FIG. 2, and supported at the edges thereof by upstanding members 16 and 18 (FIG. 3) of the card holder, which members provide appropriate slots or the like for holding the edges of the card 12. The card holder 14 is driven in oscillating or back-and-forth motion in the X direction by means of a swing-arm mechanism. The swing-arm mechanism consists of an extension arm 20, (which arm supports the card holder 14), an axis or pivot point 22, and a drive motor or drive means in the form of a voice-coil mechanism 24, wherein the voice coil moves between the pole pieces, and acts as a direct current motor for a small portion of the arcuate travel. The swing-arm mechanism is a rotary-type voice-coil positioner of the type used in a magnetic disk drive unit to position magnetic heads over a magnetic disk.

The means for reading the optical card 12 along a stripe 28 of lines of recorded information (FIG. 3) is provided by a module 26 which includes the ability to read or write data or information in machine-oriented form. The read/write module 26 is a TAOHS-LC, as manufactured by the Olympus Company of Japan, and is adjustably supported for use in the present invention.

A mechanical stop 30 is provided at each end of the arc of the card holder to prevent overtravel thereof. A pair of optical limit sensors 32 (FIG. 2), in the form of transmissive type optical position sensors and available from General Electric Company, Syracuse, N.Y. are attached to the base of the apparatus 10 for detecting the position of the card holder 14 at the ends of its swinging path. Such limit sensors 32 are supported in adjustable manner relative to the swing of the card holder 14.

In the operation of the mechanism, the optical card 12 is driven in an oscillating motion through the extension arm 20 which is attached to the voice coil drive motor 24. The integrated read/write module 26 is positioned in relation to the optical data stripe 28 so that the desired reading area is in the optical path. The positioning of the read/write head of the module 26 is controlled by suitable servo electronics as required by the optical data layout on the stripe 28. A laser light beam produced by the module 26 is directed to the stripe 28 and is reflected back to the module where the data is detected and then passed on to the read/write section.

It should be here noted that the swing-arm mechanism consisting of the arm 20, the pivot 22, and the drive motor 24 is derived from a Winchester magnetic disk drive and may be obtained from Magnetic Peripherals Inc., Minneapolis, Minn. Also it is noted that the optical card 12 is available from Drexler Corporation, Mountain View, Calif.

Figure 2:
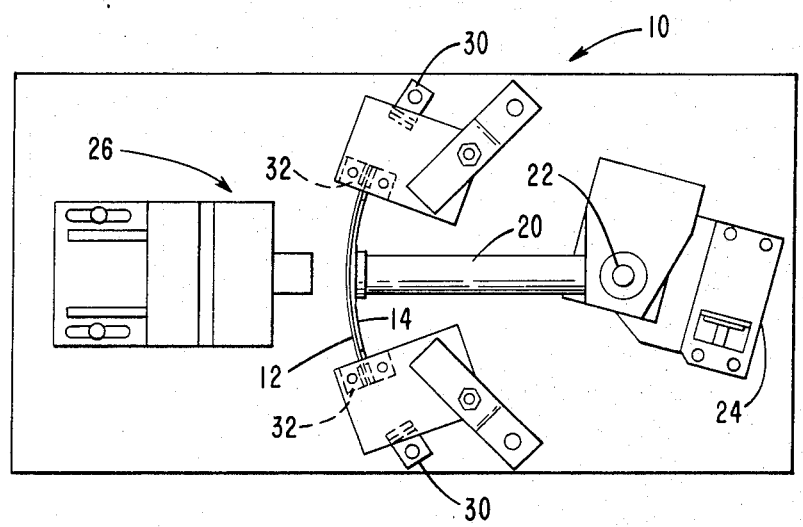
FIG. 2 is a top plan view of the apparatus shown in FIG. 1.
Figure 3:
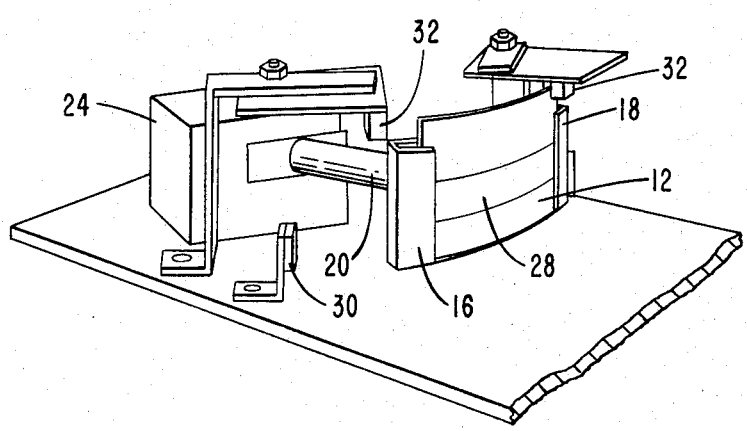
FIG. 3 is a perspective view of the apparatus.
Figure 4:
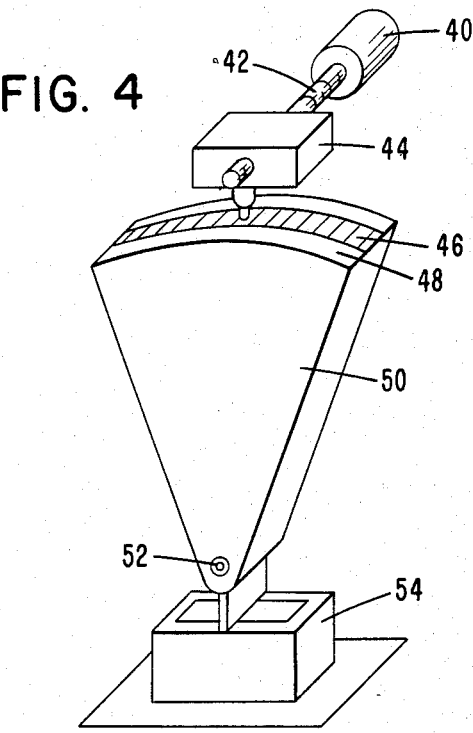
FIG. 4 is a perspective view of a modification of the invention.

A modification of the structure which may be utilized in the present invention is shown in the perspective view of FIG. 4 and includes a Y-axis or track-to-track stepper motor 40 driving a lead screw 42. The lead screw 42 is operably connected with an integrated optical read/write module 44 which is caused to be moved across the optical data stripe 46 of the optical card 48. The card holder 50 of the modification is pivoted on an axis 52 and is caused to be oscillated thereabout by a voice coil type drive motor 54. Another modification (not shown) of the invention includes the substitution of a continuous-type position sensor in place of the optical limit sensors 32, as illustrated in FIG. 2. The continuous-type sensor enables more precise control of the X direction motion for applications requiring better accuracy than is provided by limit-type sensors.

It is thus seen that herein shown and described is an optical card read/write scanning system wherein the optical card is moved in an oscillating manner by means of a voice-coil driving a swing arm mechanism. The apparatus and arrangement enables the accomplishment of the objects and advantages mentioned above, and while a preferred embodiment and a modification of the invention have been disclosed herein, other variations thereof may occur to those skilled in the art. It is contemplated that all such variations not departing from the spirit and scope of the invention hereof are to be construed in accordance with the following claims.

We claim:

1. Apparatus for optically reading a document having a transversely positioned data field thereon comprising
    means supporting the document in arcuate manner,
    means positioned opposite the data field on the document and movable in the Y direction for reading the extent of the data field, and
    means responsive to a coil signal and operably associated with the document supporting means for swinging thereof a limited manner in the X direction.

2. The apparatus of claim 1 wherein said data field comprises a plurality of lines of recorded information extending in the X direction and readable by said reading means.

3. The apparatus of claim 1 wherein the document supporting means comprises a curved member pivotally moved a predetermined distance.

4. The apparatus of claim 1 wherein the means responsive to a coil signal is a voice coil driver.

5. The apparatus of claim 2 wherein said reading means is a read/write module for reading and for generating electrical signals representative of the lines of recorded information.

6. The apparatus of claim 4 wherein the voice coil driver is a rotary magnetic disk drive actuator for oscillating the document supporting means.

7. An optical card read/write scanning system comprising an
    optical card having a field of recorded information on one surface thereof, a
    card holder formed in arcuate manner and having the one surface facing in one direction,
    read means positioned opposite the one surface and movable in the Y direction for reading the field of recorded information, and
    drive means responsive to a coil signal and operably associated with the card holder for oscillating thereof a limited distance in the X direction.

8. The system of claim 7 wherein the field of recorded information comprises a stripe extending in the X direction.

9. The system of claim 7 wherein the read means is a read/write module for reading and for generating electrical signals representative of the recorded information.

10. The system of claim 7 wherein the drive means is a rotary voice coil positioner magnetic disk actuator.

* * * * *